United States Patent [19]
Grothe

[11] 4,353,266
[45] Oct. 12, 1982

[54] MOTOR VEHICLE STEERING WHEEL COMPRISING A DEFORMABLE MEMBER

[75] Inventor: Klaus Grothe, Aschaffenburg, Fed. Rep. of Germany

[73] Assignee: Karl Schmidt GmbH, Neckarsulm, Fed. Rep. of Germany

[21] Appl. No.: 958,524

[22] Filed: Nov. 7, 1978

[30] Foreign Application Priority Data

Nov. 10, 1977 [DE] Fed. Rep. of Germany ....... 2750235

[51] Int. Cl.³ .............................................. G05G 1/10
[52] U.S. Cl. .................................................... 74/552
[58] Field of Search ...................... 74/552, 558, 558.5

[56] References Cited

U.S. PATENT DOCUMENTS 2,155,488  4/1939  Hendrie ................................. 74/552
3,614,901  10/1971  Henning ................................ 74/552

FOREIGN PATENT DOCUMENTS 1278858  5/1963  Fed. Rep. of Germany .
1970385  10/1967  Fed. Rep. of Germany .
7125806  7/1971  Fed. Rep. of Germany .
2129286  12/1972  Fed. Rep. of Germany .

*Primary Examiner*—Kenneth Dorner
*Attorney, Agent, or Firm*—Karl F. Ross

[57] ABSTRACT

A motor-vehicle steering wheel has a rim, spokes and a deformable member, which occupies part of a bowl space and lies on a recessed hub of the steering wheel. In order to increase the passive safety, the rim of the steering wheel, the outside periphery of the hub of the steering wheel, the spokes of the steering wheel, and the surface of the deformable member are covered with a coherent layer of polyurethane integral skin foam.

4 Claims, 5 Drawing Figures

MOTOR VEHICLE STEERING WHEEL COMPRISING A DEFORMABLE MEMBER

FIELD OF THE INVENTION

This invention relates to a motor-vehicle steering wheel comprising a deformable body, which is disposed within the rim of the steering wheel over the recessed steering wheel hub, which is connected by spokes to the rim of the steering wheel. The deformable member occupies part of the bowl of the wheel and rests on the upper surface of the spokes and on the end face of the hub of the steering wheel.

BACKGROUND OF THE INVENTION

A steering wheel for automotive vehicles comprises the usual rim, which can be of round cross-section, connected to a hub by spokes. In a bowl-shaped wheel of the type with which the present invention is concerned, the hub is connected to a bowl from which the spokes extend.

Deformable members are used to increase the passive safety in motor vehicles. When the motor vehicle is sharply decelerated due to an accident, the deformation member is intended to prevent an impact of the head of the driver on the upper portion of the steering wheel rim or on steering wheel spokes when the maximum load of the safety belt applied by the driver has been exceeded.

When a driver who has not used a safety belt is involved in a collision at low or medium speed, such deformable members have been found to decrease the risk of an injury from the impact of the body of the driver on the steering wheel.

Known deformable members have included metallic deformable pots or bowls connected between the steering wheel and steering column (German Federal Republic Pat. No. 947,048), or deformable tubular elements of metal, which have diamond-shaped apertures (German Patent Publication-Auslegeschrift-No. 19 12 528).

A deformable member which has a smooth surface and occupies a substantial part of the cross-section of the steering wheel and consists entirely of an inelastic, homogeneous hard foam of polyurethane or the like, only capable of plastic deformation, may be arranged within the rim of the steering wheel and secured to the steering wheel hub (German Federal Republic Pat. No. 23 12 843).

It is also known to cover the rim and spokes of the steering wheel and the periphery of the hub of the steering wheel with soft elastic synthetic-resin material in order to improve the passive safety and to improve the hand grip and the appearance. A deformable member consisting of the same synthetic-resin material may be provided on the rim of the steering wheel. Such elements are commonly known as wheel covers and can be applied in a variety of ways.

Particularly in zones containing a large amount of foam, such synthetic-resin foams have an inadequate inherent strength. For this reason, German Utility Model No. 75 30 843 teaches the use of reinforcing members, which are embedded in the plastic foam and secured, e.g., to the spokes of the steering wheel. Another disadvantage of conventional plastic foams used for this purpose is that they are capable only of elastic deformation.

OBJECT OF THE INVENTION

It is an object of the present invention to provide a motor-vehicle steering wheel of the kind defined hereinbefore but such that the passive safety is improved and a good hand grip and pleasing appearance are obtained, all with elimination of the drawbacks of earlier systems.

SUMMARY OF THE INVENTION

This object is accomplished in that the rim and the outside periphery of the hub of the steering wheel and the spokes of the steering wheel, except for the portions contacted by the deformable member, which consists in known manner of a plastically deformable, homogeneous material, as well as the surface of the deformable member, excepting its surface areas in contact with the spokes and the end face of the hub of the steering wheel, are covered with a coherent layer of polyurethane integral skin foam.

The deformable member may particularly consist of hard polyurethane foam, polystyrene foam, phenolic resin foam, metal wire mesh or the like.

The motor-vehicle steering wheel according to the invention can be manufactured in a relatively simple manner in that the skeleton of the motor vehicle steering wheel and the deformable member are placed in a casting mold to define with the hub of the steering wheel a clearance which corresponds to the required thickness of the layer of polyurethane integral skin foam, and polyurethane integral skin foam is then formed around the skeleton of the steering wheel and around the deformable member excepting those areas of the spokes and hub of the steering wheel which are in contact with the deformable member.

That method permits of a time-saving manufacture of a motor vehicle steering wheel which has a good hand grip and a pleasing appearance and comprises a deformable member having a high plastic deformability. All measures previously required to ensure the dimensional stability of motor vehicle steering wheels covered with polyurethane integral skin foam can be eliminated. Because the specific gravity of polystyrene foam is about 60% lower than the specific gravity of polyurethane integral skin foam, the use of polystyrene foam as the deformation body results in a considerable saving in weight. This complies with the general desire to decrease the weight of motor vehicles. In addition to these advantages, the costs are decreased considerably because foams of the kind stated are offered at lower costs than polyurethane integral skin foam.

BRIEF DESCRIPTION OF THE DRAWING

The above and other objects, features and advantages of the invention will become more readily apparent from the following description of the best mode currently known to me for carrying it out in practice. The description is given with reference to the drawing in which.

SPECIFIC DESCRIPTION

Figures 1, 2, 3, 4, 4A:
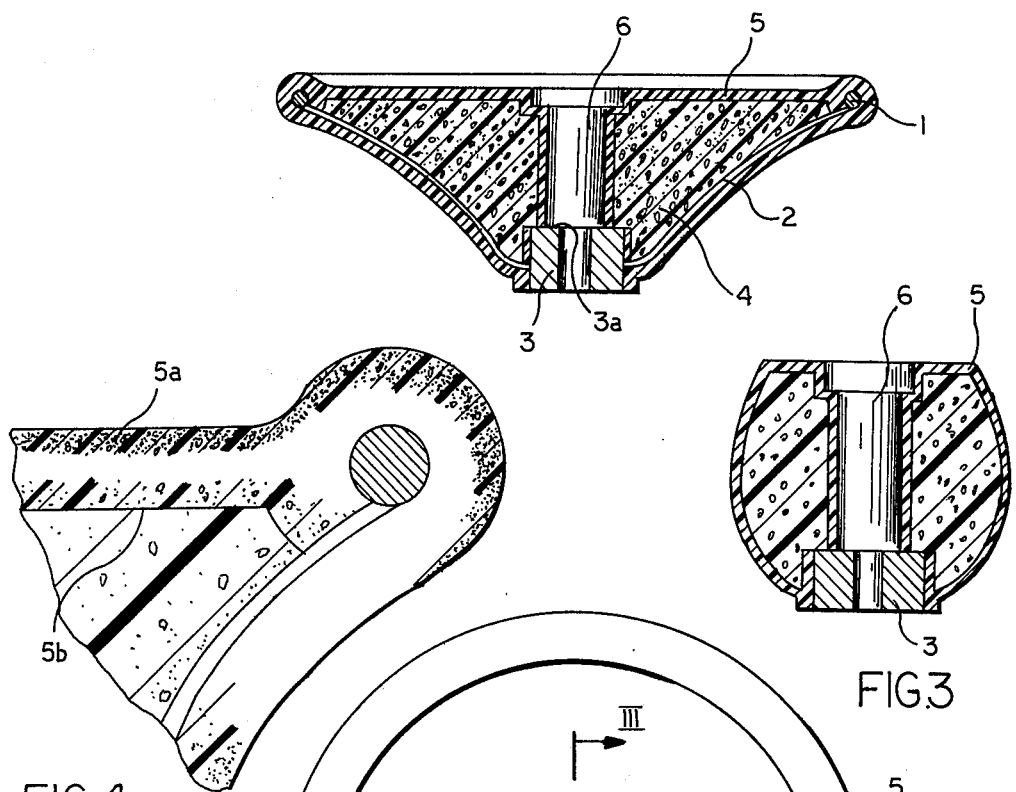
FIG. 1 is a top plan view showing the steering wheel of a motor vehicle according to the invention.
FIG. 2 is a transverse sectional view taken on section line II—II of FIG. 1 through the motor-vehicle steering wheel.
FIG. 3 is a section taken along line III—III of FIG. 1.
FIG. 4 is a detail view in section.
FIG. 4A represents a modification thereof.

The skeleton of the steering wheel consists of a circular-section metal wire rim 1, circular section metal wire spokes 2, and a hub 3.

A deformable member or body 4 consisting of polystyrene foam lies on the upper surface of the spokes 2. In FIG. 4A the deformable member 4' consists of metal wire mesh.

The rim 1, the hub 3 and the underside of the spokes 2 of the steering wheel as well as the deformable member 4 are covered with a layer 5 of polyurethane integral skin foam, except for those surface areas of the deformable member which lie on the upper surface of the spokes and on the end face of the hub of the steering wheel.

During the assembly of the steering wheel, the control for the horn is inserted into an opening 6, which is lined with the layer of polyurethane integral skin foam.

The polyurethane integral skin foam 5 is molded unitarily and, as can be seen in FIG. 4 has an inner foam region 5b and the outer skin 5a which is more dense.

I claim:

1. In a motor vehicle steering wheel comprising a rim, a recessed steering wheel hub, means forming a bowl diverging upwardly and outwardly from said hub to said rim, spokes connecting said hub to the rim and a deformable member disposed within said bowl and within the confines defined by said rim of the steering wheel over said recessed steering wheel hub, which is connected by said spokes to the rim of the steering wheel, said spokes having upper surfaces and said deformable member occupying part of the bowl and lying on the upper surfaces of the spokes and on an end face of the hub of the steering wheel, the improvement wherein the rim, an outside periphery of the hub of the steering wheel and the spokes of the steering wheel, except for the portions contacted by the deformable member, and the deformable member except for its surface areas in contact with the spokes and the end face of the hub of the steering wheel, are covered with a coherent layer of polyurethane integral skin foam, said member constituting a unitary plastically deformable homogeneous body.

2. An automotive vehicle steering wheel comprising:
   a steering wheel rim lying in a plane and surrounding an axis;
   a steering-wheel hub spaced from said plane along said axis and of smaller diameter than said rim;
   a plurality of spokes reaching from said hub to said rim and connecting said hub to said rim while defining a bowl with said rim and said hub whereby the steering wheel is of the bowl type;
   an annular unitary plastically-deformable homogeneous body forming a deformable member received in said bowl, lying in contact with said spokes, surrounding said hub and extending between said hub and said plane; and
   a coherent layer of polyurethane integral skin foam covering said rim, an outer periphery of said hub, said spokes apart from portions thereof contacted by said deformable member, and all of said deformable member except for surfaces thereof in contact with the spokes and an end face of said hub toward said plane.

3. The steering wheel defined in claim 2 wherein said body is selected from the group which consists of hard polyurethane foam, polystyrene foam, phenolic resin foam and metal wire mesh.

4. The steering wheel defined in claim 3 wherein said body is composed of polyurethane foam.

* * * * *